Sept. 4, 1951 H. H. KEEN 2,566,942

RECORD SENSING DEVICE

Filed Aug. 9, 1950 7 Sheets-Sheet 1

INVENTOR
HAROLD H. KEEN
BY William Lang
ATTORNEY

Sept. 4, 1951  H. H. KEEN  2,566,942

RECORD SENSING DEVICE

Filed Aug. 9, 1950  7 Sheets-Sheet 2

INVENTOR.
HAROLD H. KEEN

BY William Lang

ATTORNEY

RECORD SENSING DEVICE

Filed Aug. 9, 1950 7 Sheets-Sheet 3

INVENTOR.
HAROLD H. KEEN
BY William Lang
ATTORNEY

Sept. 4, 1951 H. H. KEEN 2,566,942

RECORD SENSING DEVICE

Filed Aug. 9, 1950 7 Sheets-Sheet 4

INVENTOR.
HAROLD H. KEEN

BY William Lang
ATTORNEY

INVENTOR.
HAROLD H. KEEN
BY William Lang
ATTORNEY

INVENTOR.
HAROLD H. KEEN
BY William Lang
ATTORNEY

INVENTOR.
HAROLD H. KEEN
BY
William Lang
ATTORNEY

Patented Sept. 4, 1951 2,566,942

UNITED STATES PATENT OFFICE 2,566,942

RECORD SENSING DEVICE

Harold H. Keen, Letchworth, England, assignor to International Business Machines Corporation, New York, N. Y., a corporation of New York Application August 9, 1950, Serial No. 178,428
In Great Britain August 22, 1949

18 Claims. (Cl. 235—61.11)

This invention relates to apparatus for sensing record cards on which numerical or alphabetical data are recorded.

In the well known punched card tabulating machine, cards are fed from a supply magazine past one or more sensing stations in which the records are sensed and are then passed into a card stack or stacker. Each card, as soon as it is fed from the magazine, is fed at uniform speed, and the data read depend on the time in the cycle at which the data indications are sensed.

The principal object of the invention is a device whereby any card may be diverted from its normal course between magazine and stacker and, after being sensed at the sensing station (or one of the sensing stations), may be passed a second time through the sensing station and again sensed before being passed to the stacker.

Another object is a device whereby any card may be passed any desired number of times through a sensing station and sensed thereat, the number of passages being either predetermined for a plurality of cards or determined for each card by a control record previously sensed.

Another object is a device whereby a card, between two successive sensings at the same station, is shifted in phase, so that in each column, one set of index positions is sensed at the first sensing and a different set of index positions is sensed at the second sensing.

Data are most usually recorded by holes punched in the card, but they are also recorded in commercial work by electrically conducting marks, and may also be recorded by marks sensed by light cells. In the following description it will be assumed that data are recorded by punched holes, but the invention is applicable to the said other forms of recording.

The invention will be described in its application to the well known punched card tabulating machine, but it is applicable to other machines in which cards are fed past a sensing station.

A cyclically operating machine having apparatus for feeding cards from a magazine to a stacker past one or more sensing stations is characterized, according to the invention, by means for diverting a card from its normal course after it has been sensed at the, or one of the, sensing stations, taking it once or more times around a closed path including the said sensing station and then returning it to its normal course, whereby the card is sensed twice or more times at the same sensing station.

A rotating contact roll at the said sensing station may have at its ends grippers adapted when operated to hold the card on to its periphery and located so that when they are not operated the card passes tangentially to the roll along its normal course and, when they are operated, the card is diverted from its normal course by being held on the periphery of the roll. The said sensing station may be the second of two sensing stations through which the card passes successively, with means for feeding it past the first sensing station and means for feeding it past the second sensing station and a clutch device between the two feeding means, whereby the two feeding means may operate simultaneously to feed the card in its normal course or the second feeding means may operate alone to feed the card in its diverted course, while the first feeding means is inoperative. The gripper operating means may be controlled by a record sensed in the first sensing station, the control being through an electrical circuit which determines, according to the value of the record sensed, the number of cycles during which the grippers are operated to cause the card to be diverted from its normal course for repeated sensing. When the sensing device actuates control means for controlling the printing of data from a plurality of fields on the card, means may be provided for sensing the plurality of fields in successive cycles, whereby the printing of the data in each field may be effected on a different line. Means may be provided, when a card is sensed twice at a sensing station, for effecting a phase shift of the card between the two sensings, whereby different sets of index positions are sensed in the two sensings. The feeding means controlling the rotation of the rotating contact may contain a differential gear and there may be means for turning one element of the differential gear to effect a phase shift of the contact roll.

Other objects of the invention will be pointed out in the following description and claims and illustrated in the accompanying drawings, which disclose, by way of examples, the principle of the invention and the best mode, which has been contemplated, of applying that principle.

Figure 9:
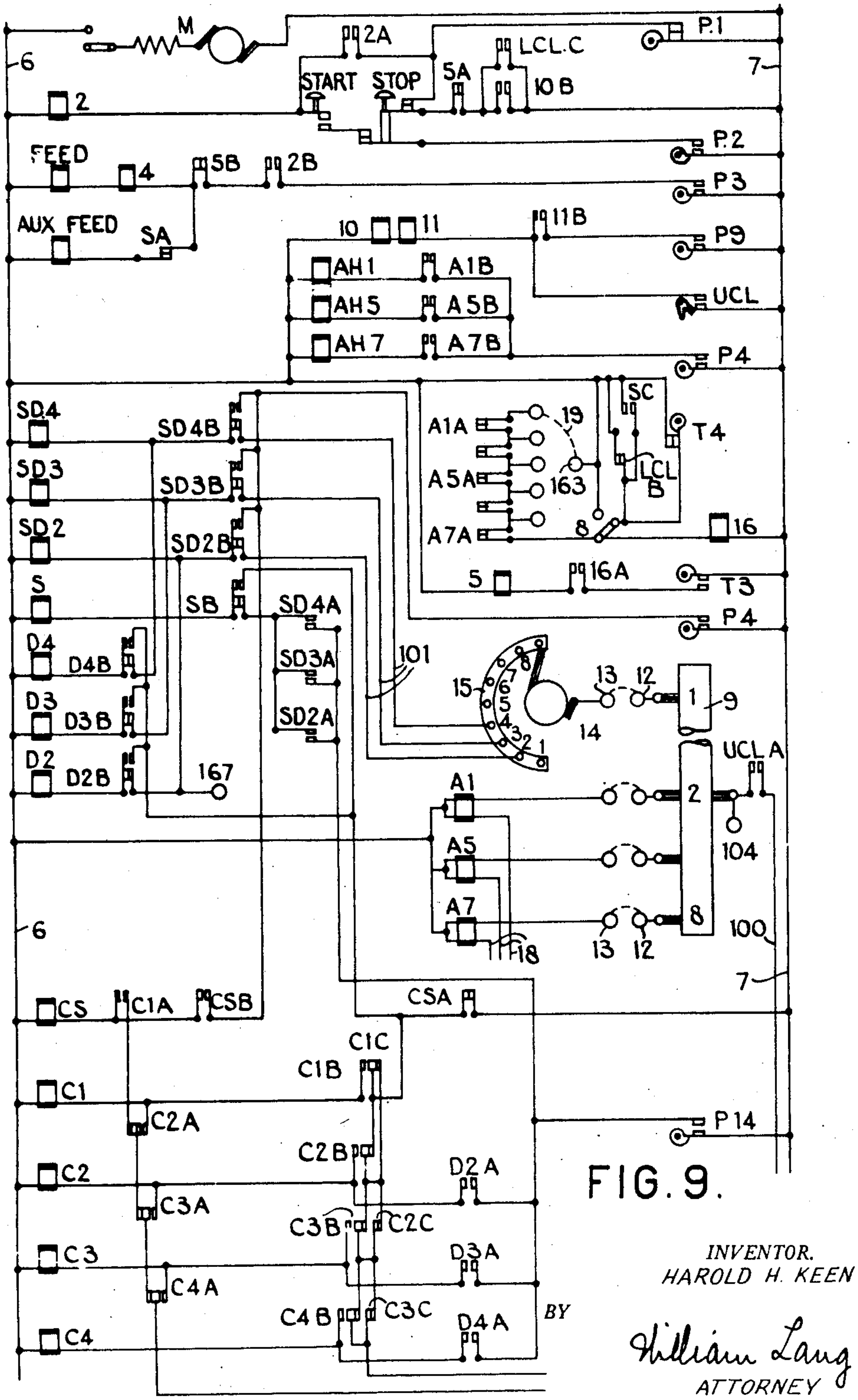
Figure 9A:
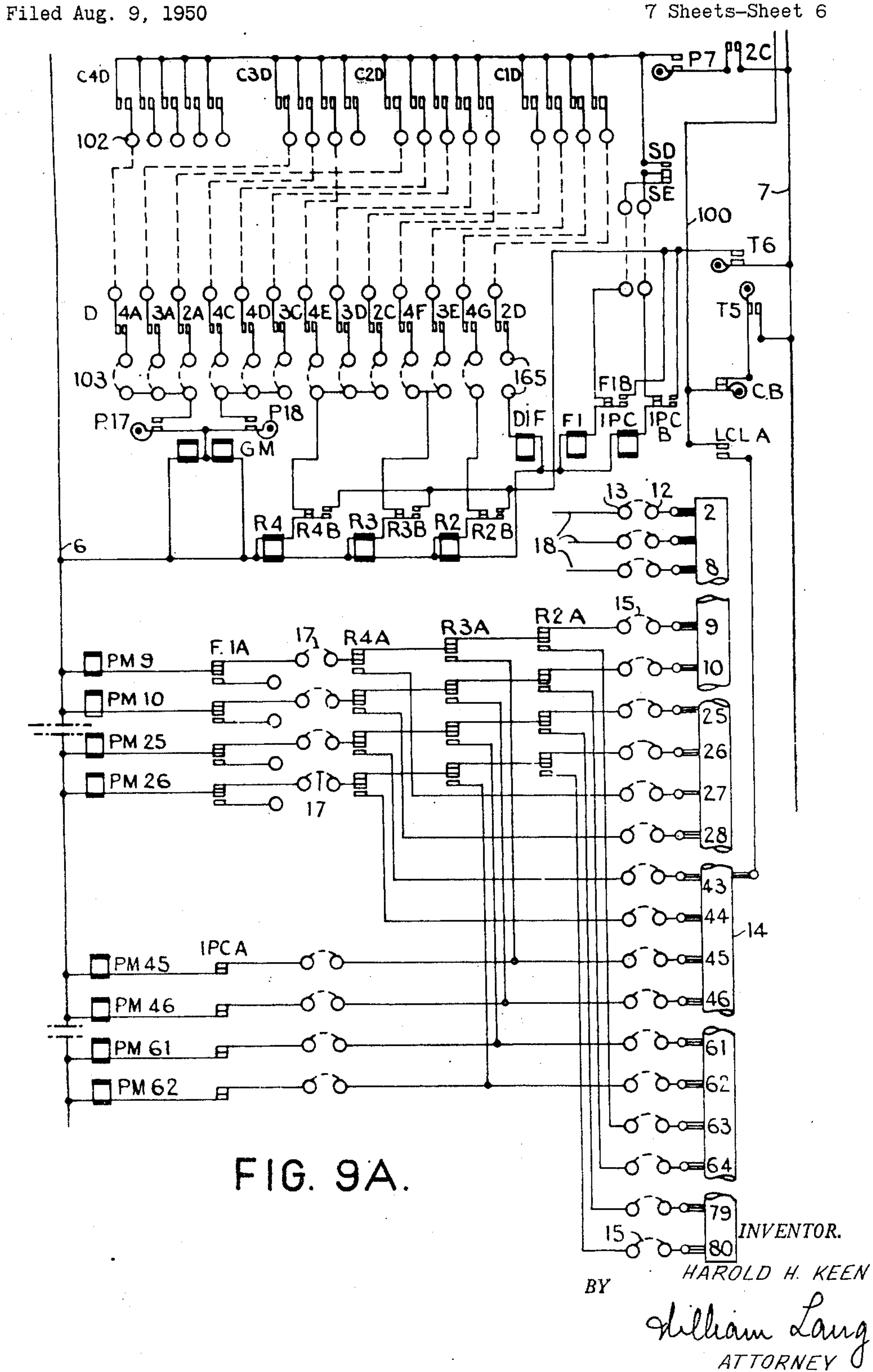

Fig. 9 and Fig. 9A placed one under the other in the order named form a circuit diagram of the electric circuits of the apparatus.

Figure 10:
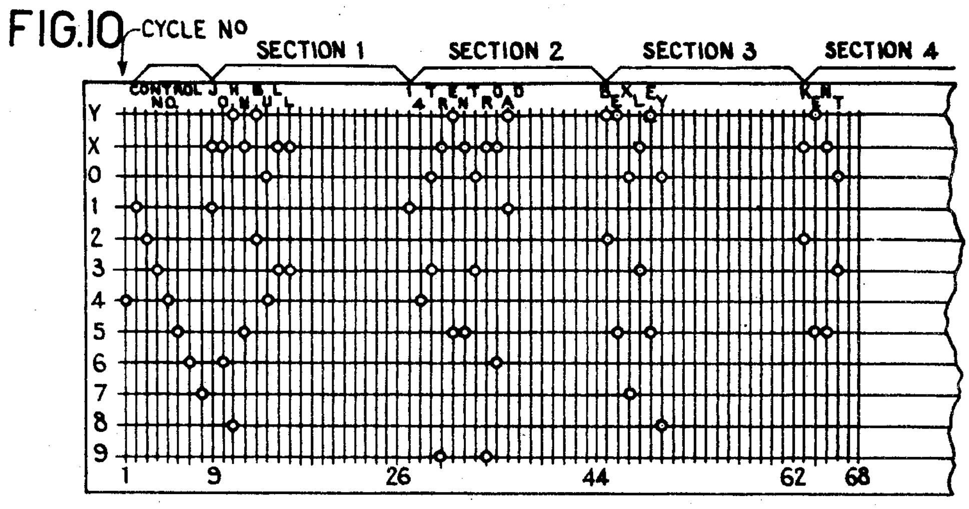

Fig. 10 is a part view of a card of which different fields are to be printed on different lines.

Figure 11:
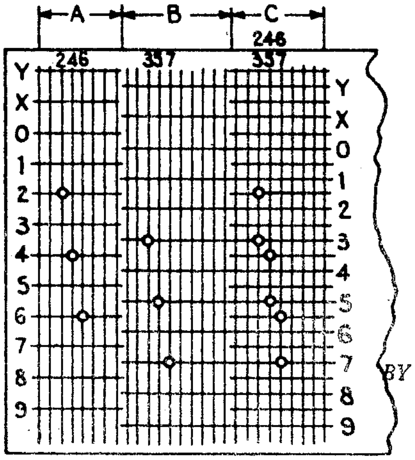
Figure 12:
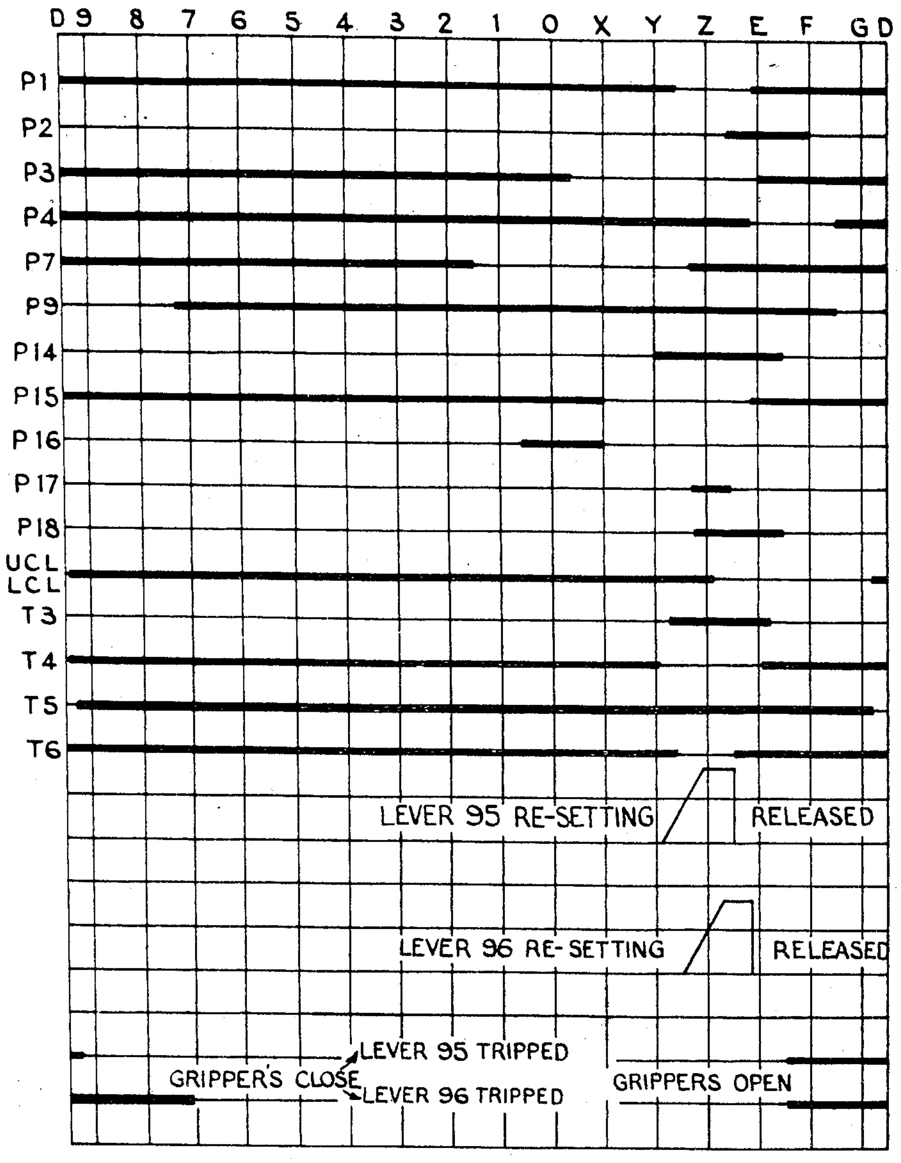

Fig. 11 is a part view of a card containing two independent records in each column; and Fig. 12 is a timing diagram.

Figure 1:
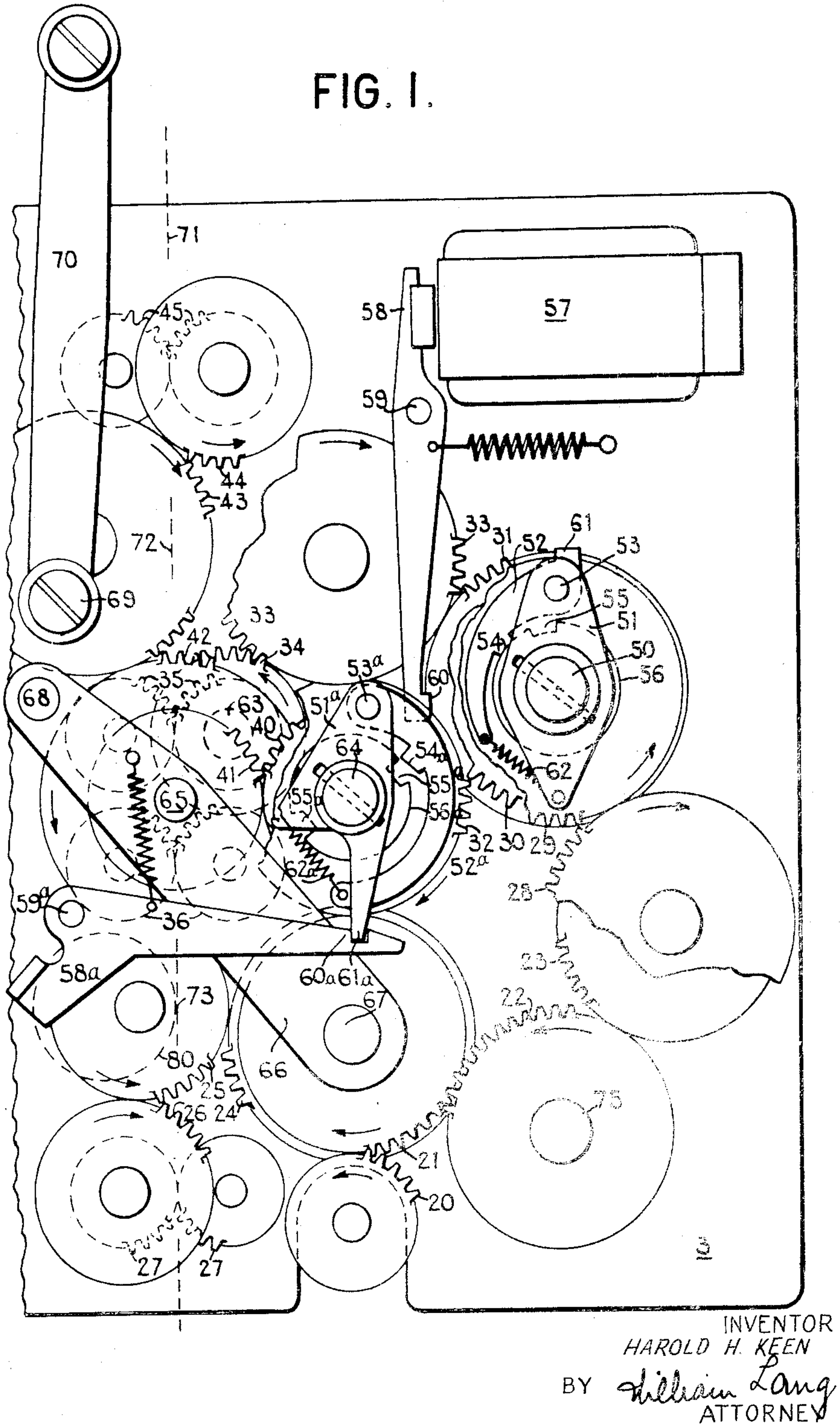
Fig. 1 is a side view of the gearing of the feeding apparatus outside one end plate.

Fig. 1 shows the gearing on the side plate 3 of the feeding mechanism of a punched card tabulating machine, modified for carrying out the invention. Gear wheel 20 is driven continuously from the motor of the tabulator. It drives gear wheels 21, 22 and 23. Attached to wheel 21 is a wheel 24 which drives gear wheels 25 and 26. Wheel 26 is on the shaft of one of a pair of card feed rolls which drives the other roll through the gear wheels 27. Attached to the gear wheel 23 is a gear wheel 28 which drives a gear wheel 29. All the gear wheels designated 20 to 29 are continuously running.

The gear wheel 29 is loose on the shaft 50, but may be connected to it by the one-revolution clutch between the wheel and the plate 51 fixed to the shaft. This clutch is of known construction and consists in the pawl 52 pivoted to the plate 51 at 53, having a projection 54 for engaging the notch 55 in a collar 56 on the wheel 29. The clutch is controlled by the magnet 57, with armature 58 pivoted at 59. When the magnet is not energized, the armature is in the position shown and the projection 60 on the armature 58 is in a position to engage the projection 61 on the pawl 52, as the plate 51 turns counterclockwise, so as to turn the pawl clockwise, and withdraw the projection 54 from the notch 55, thus freeing the wheel 29 from the plate 51 and shaft 50. On energizing the magnet 57, the pawl 52 is free to be turned by the spring 62 to engage projection 54 in notch 55, to lock the shaft 50 to the wheel 29. Assuming that the magnet is de-energized before the shaft 50 has completed a revolution, the projection 61 is caught by the projection 60 to free the shaft from the wheel 29 after one revolution.

The gear wheels 30 and 31 are both fixed to the shaft 50. Wheel 30 turns gear wheel 32 and wheel 31 turns gear wheel 33 which turns gear wheel 34. Wheel 34 is on the shaft 63 of one of a pair of card feed rolls which are geared together by gear wheels 35. Immediately below these is another pair of card feed rolls geared together by the gear wheels 36; these are driven from the gear wheels 35 by an idle gear wheel loose on the shaft 64, and not shown. The gear wheels 30 to 36 are all turned when the clutch 51, 52 is engaged.

The gear wheel 32 is loose on the shaft 64, and carries a half-revolution clutch which enables it to be connected to the shaft by means of the plate 51*a*. Parts corresponding to the parts of the clutch 51, 52 are given the same reference nummerals, but with a lower case letter following the numeral; the magnet, however, is not shown. The only material difference between the two clutches is that the collar 56*a* has two notches 55*a*, whereby the clutch can be engaged at either of two points in the revolution, and disengaged after half a revolution.

The collar 56*a* is on a gear wheel 40 which, therefore, is turned when the clutch 51*a*, 52*a* is engaged. Wheel 40 turns gear wheel 41, which is fixed to gear wheel 42. These two wheels turn on a stud 65 held in a plate 66 which is supported on the studs 67 and 68. Wheel 42 turns gear wheel 43, which turns gear wheel 44, which is on the shaft of one of a pair of card feed rolls geared together by gear wheels 45. Wheel 43 carries a crank-pin 69 and connecting rod 70. All the wheels 40 to 45 turn when the clutch 51*a*, 52*a* is engaged.

The connecting rod 70 is connected with the crosshead and picker knife which is used in all punched card tabulating machines for picking the cards one by one from the magazine and delivering them to the first pair of feed rolls driven by gear wheels 45. The line 71 is that followed by the cards in their normal passage from the magazine to the stack, and, designating the feed rolls by the gear wheels driving them, the cards are fed along this passage by the feed rolls 45, 35, 36 and 27. They are first sensed by the upper brushes, at the point 72, and, a cycle later, by the lower brushes at the point 73.

When a card is to be sensed a second time by the lower brushes, it is gripped by a gripper roll at the point 73, taken around by the roll and brought again past the point 73, where it is sensed a second time. The position of the gripper roll is indicated by the dotted circle 80.

Figure 3:
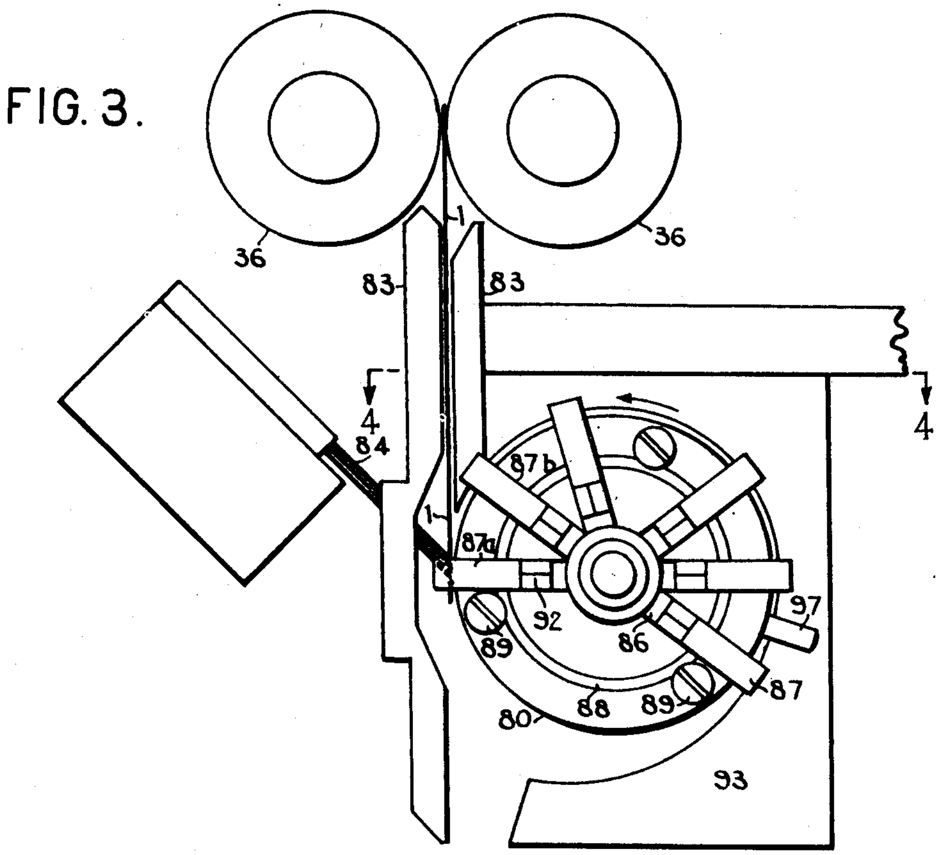
Fig. 3 is a view of the end of the gripper roll.
Figures 4, 5:
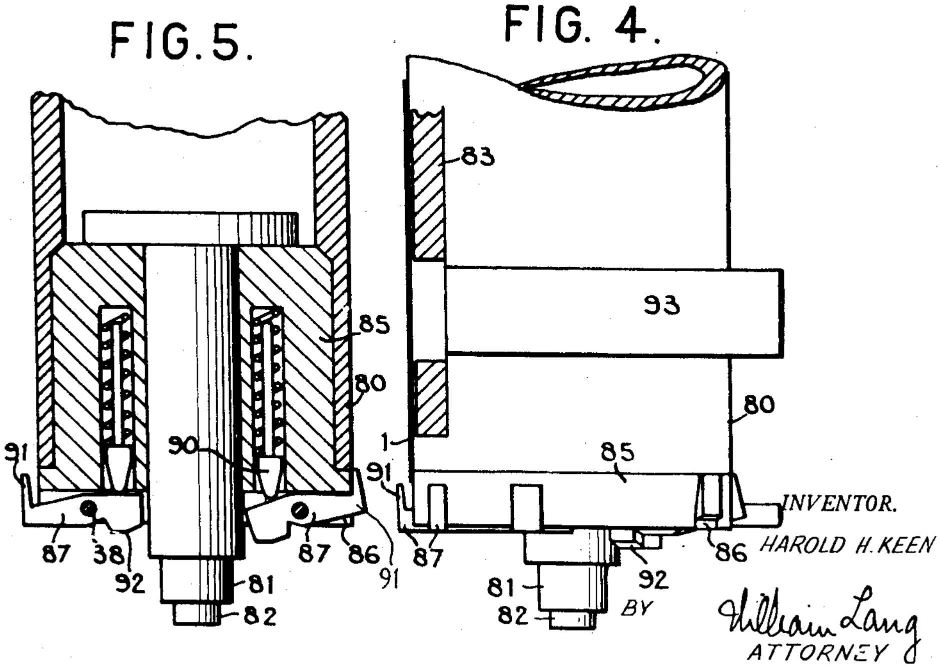
Fig. 4 is a section on the line 4—4 of Fig. 3.
Fig. 5 is a central section through the end part of the gripper roll.

Figs. 3, 4 and 5, to a scale twice that of Fig. 1, show the gripper roll with devices for gripping the card.

Figures 6, 7, 8:
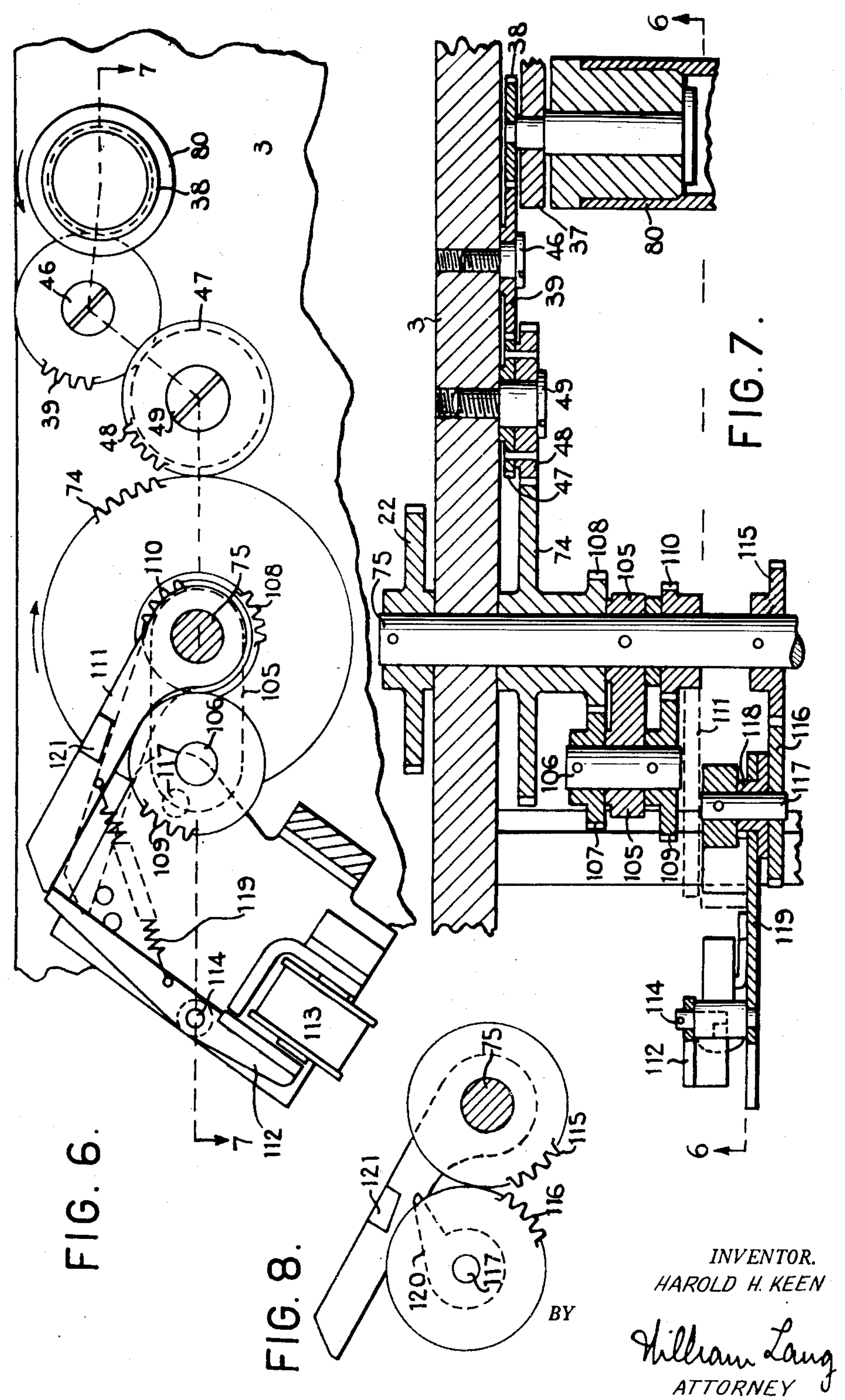
Fig. 6 is a side view and part section of the gearing for driving the gripper roll, taken along the line 6—6 of Fig. 7.
Fig. 7 is a section along the line 7—7 of Fig. 6.
Fig. 8 is a view of a detail of the gearing in Fig. 7.

The gripper roll 80, with bearings 81, is turned by a gear wheel on the end 82 (Figs. 4, 5 and 7). The card 1 passes between the feed rolls 36 (Fig. 3), and between guide plates 83 to touch the periphery of the gripper roll. A row of brushes 84 passes through slots in the left hand guide plate 83 to press against the card 1, so that contact is made between a brush and the gripper roll whenever a hole in the card passes under the brush. The brushes and the left hand guide plate are not shown in Fig. 4, which is a section along the line 4—4 of Fig. 3. The two ends of the gripper roll are similar. Each is formed by a block of insulating material 85. Pivoted in slots 86 are six grippers 87. The common pivot of these grippers is a wire 88 held in a circular slot by screws 89. As shown in Fig. 5, each gripper is acted on by a spring pressed plunger 90, which tends to turn the gripper into the position shown at the right hand side of Fig. 5, in which the claw 91 is pressed against the surface of the roll. By means to be described, whereby pressure is applied to the cam surfaces 92 of the grippers, they can be held in the positions shown at the left of Figs. 4 and 5. In this position, as seen in Fig. 4, the card 1 is free of the claw, but, if the gripper were made free to turn under the action of the plunger 90, the claw would move to grip the edge of the card against the roll.

If a card is to be sensed only once in the lower sensing station, the grippers 87 are not operated, and then the card passes straight downwards, to be fed to the card stack.

If, however, a card is to be sensed a second time, the gripper 87*a* is operated to grip the card, approximately when the leading edge of the card has passed the brush 84, as shown in Fig. 3. As the gripper roll is turned, the next gripper 87*b* is operated, and similarly all six grippers at each end of the roll are operated in succession to hold the card to the periphery of the roll. Guide pieces 93 are provided at intervals along the roll to keep the whole length of the card close to the periphery of the roll.

When the roll has made a complete turn, the leading edge of the card is brought a second time under the brushes and the whole card is sensed a second time. If the card is to be sensed a third time, the grippers are left in their operative position.

Figs. 6 and 7 show the side plate of the feeding mechanism, with the gearing on the inside of the plate. The gear wheels shown on the outside as in Fig. 1 are omitted from Fig. 7, with the exception of gear wheel 22, which is one of the wheels continuously driven. These figures are to the same scale as Fig. 1. The gripper roll 80 is supported by its bearing 81 (Fig. 4) in a plate 37 (Fig. 7) attached to the side plate 3. On the end 82 (Fig. 4) is fixed a gear wheel 38 which is turned by the gear wheel 39 on the stud 46. This wheel is turned by the gear wheel 47, which is fixed to the gear wheel 48, both turning on the stud 49. Wheel 48 is turned by the gear wheel 74 on the shaft 75. The gearing shown to the left in Fig. 7 is for the purpose of giving a phase shift to the card and is not required for the example to be first described. Its explanation will therefore be postponed, and it will be assumed that gear wheel 74 is fast on the shaft 75, so that the gripper roll 80 is turned continuously from the gear wheel 22, through the gearing just described.

Figure 2:
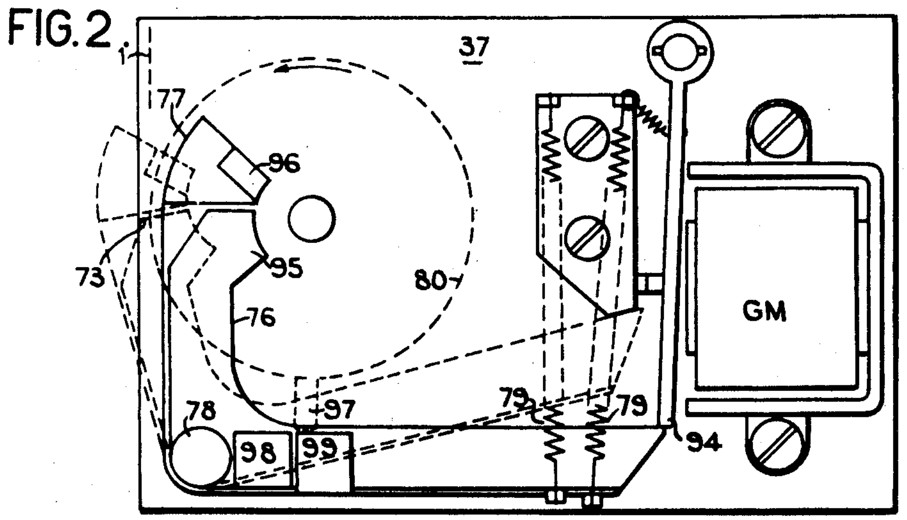
Fig. 2 is a view of the parts beyond the end of the gripper roll.

Fig. 2 shows the cam levers which operate the grippers on the gripper roll. The view is looking at the side plate 37 (Fig. 7) from the gripper roll, this being omitted, but its position indicated by the dotted circle 80.

Two cam levers 76 and 77 are pivoted at 78 and pressed counterclockwise by springs 79. They are both held against the springs 79 by the armature 94 of the gripper magnet GM. When this is energized, the two levers 76 and 77 turn or tend to turn into the position shown in dotted lines. When the levers are in their full line position, their cam surfaces 95 and 96 are at a radius at which they engage the cam surfaces 92 (Fig. 5) of the grippers to open them, that is to say, to keep their hooks 91 clear of the surface of the gripper roll. When the magnet GM is energized to enable the levers to take up their dotted line position, the surfaces 95 and 96 are clear of the cam surfaces of the grippers and these, therefore, remain in their normal closed position.

Referring to Fig. 3, a pin 97 is located on the edge of the gripper roll to engage two lugs 98 and 99 on the levers, as the roll turns, and restore the levers to their full line position. The position of the pin 97 when engaging the lug 99 on lever 96, and after having re-set lever 76, is shown in dotted lines. The line of passage of the cards is shown by the dotted line 1, and the point at which the brushes 84 (Fig. 3) contact the card or roll by 73.

If, when the pin 97 is in the position shown, the magnet GM be energized, the lever 76 alone will be released to allow any gripper reaching the horizontal position to close. If the magnet GM remains energized, till the pin 97 is free of the lug 99, the lever 77 will allow the succeeding gripper to close. The gripper magnets and levers shown in Fig. 2 are duplicated at the other end of the gripper roll.

Referring now to Fig. 10, this shows a portion of a punched card tabulating machine card with a four-line name and address recorded on it, namely. John Bull 14 Trent Road Bexley Kent. The two sets of lines indicate by their intersections the different index positions in which records can be made. In each column there are 12 index positions which are sensed in the order 9 to 0 and X and Y. The index positions 0 to 9 are used for recording numerals. Letters are recorded by two holes or marks in a column, according to the well known four-zone-code, one of the index positions 0, X, Y being used in conjunction with one of the index positions 9 to 1 to represent letters of the alphabet. The records are shown diagrammatically by small circles at the index positions. In column 1, a record is made at index position 4, to indicate that the name and address has to be printed in four successive lines. In columns 2 to 8, a control number 1 2 3 4 5 6 7 is recorded. The remainder of the 80 columns in the card is divided into four sections, comprising respectively columns 9–26, 27–44, 45–62, 63–80. The above-mentioned name and address is shown recorded in these sections, each section being allocated to matter to be printed on a single line.

Hitherto it has generally been customary, in printing from record cards invoices or notices of insurance policy premium, to use a plurality of cards for the name and address, the matter recorded on successive cards being printed on successive lines. By means of the invention a single card, as shown, may be used for this purpose instead of four cards. A card or cards following the address cards contain details of the invoice or the amount of the premium, and this matter is sensed and printed in the customary way.

Figs. 9 and 9A together are circuit diagrams of the tabulating machine which cause a name and address, as in Fig. 10, to be printed in four successive lines in four successive cycles of the machine.

Fig. 12 shows the times in each cycle of the machine at which the various cam contacts and card levers close and open their contacts. The times are indicated by the index point positions and the periods of closure of contacts are indicated by a heavy line.

The two supply lines are 6 and 7; the motor M is connected across these by the switch shown and runs continuously.

It is assumed that cards in a magazine are ready to be fed to the sensing stations, the first card being a name and address card as in Fig. 10. The start key is pressed to complete a circuit from line 6 through relay 2, start and stop key contacts 101, 102 and cam contacts P2 to line 7, contacts P2 closing near the end of a cycle. Contacts 2A then close to hold relay 2 energized through cam contacts P1, which are closed except for a short time near the end of the cycle, and are closed before contacts P2 open. Closing of contacts 2B completes a circuit through the Feed and Auxiliary Feed magnets, relay 4, contacts 5B and 5A (normally closed), contacts 2B and cam contacts P3. Magnet 57 (Fig. 1) and the magnet controlling the armature for the half-revolution clutch are the feed and auxiliary feed magnets respectively. When, therefore, these are energized, all the gear wheels of Fig. 1 rotate and the connecting rod 70 feeds the first card to the feed rolls 45 which feed it past the upper sensing station at the point 72. The start key is kept closed to maintain the circuit of relay 2 during the opening of P1 and P2. The first card, when fully in the upper sensing station, closes the contacts of the upper card lever UCL at the end of the cycle. This completes a circuit from line 6 through relays 10 and 11 to line 7, and there is a holding circuit for these relays through contacts 11B and cam contacts P9. Contacts 10B close to form a shunt across contacts P1, enabling the start key to be released without breaking the circuit of relay 2.

The upper sensing station is shown with contact roll 9, and brushes connected to plug sockets 12, which are shown connected to plug sockets 13. The contact roll 9 is connected through contacts UCL.A (closed when cards are passing), line 100, circuit breakers CB (Fig. 9A) and cam contacts T5 to line 7. During the passage of the card, column 1 is sensed by a brush (opposite the numeral 1 on the contact roll) connected through sockets 12 and 13 to the center brush 14 of a commutator 15. Lines 101 from points 2, 3 and 4 on the commutator (corresponding to index positions 2, 3 and 4, respectively, on the card) are connected through contacts SD.2B, 3B and 4B and through relays SD.4, 3 and 2, respectively, to line 6. In the present example, a 4 is recorded in column 1, and therefore a circuit is completed from the 4 point on the commutator to energize relay SD.4, and, simultaneously, through contacts D.4B, to energize relay D.4. If the name and address had required only 3 or 2 lines, 3 or 2 would have been recorded in column 1, and then relays SD.3, or 2, and D3, or 2, respectively, would have been energized.

Relay SD.4 being energized, its make-before-break contacts SD.4B are changed over, thereby holding the relay through cam contacts P4. Contacts SD.4A also close to complete a circuit from line 6, summary relay S, contacts SB and SD.4A to cam contacts P14 and line 7. It may be noted that the relay S is thus energized whichever of the SD relays is energized. Relay S changes over its contacts SB to connect the relay to line 7 through contacts CS.A. Thus relay S is held energized till contacts CS.A open, which is after the four lines of address have been printed; relay SD.4, however, is de-energized when contacts P4 open at the end of the cycle.

Contacts SA of the summary relay open the circuit of the auxiliary feed magnet, thereby stopping all gear wheels 40 to 45 in Fig. 1, and stopping the feed of cards from the magazine, the second card being stopped in the upper sensing station.

It was mentioned that D.4 relay was energized simultaneously with relay SD.4. Its contacts D.4B change over to connect the relay to line 7 through contacts CS.A. Also its contacts D.4A close to complete a circuit from line 6, through cycle relay C4, contacts D.4A and cam contacts P.14 to line 7. Relay C.4 then closes its contacts C4.B to connect the relay to line 7 via cam contacts P15, and also via a parallel circuit through contacts C3.C, C2.C, C1.C and CS.A.

The card is now entering the lower sensing station, its lower edge approaching the sensing point 73. Relay C4 being energized, the plug sockets 102 (Fig. 9A) are connected to line 7 through cam contacts P7 and contacts 2C. A plug socket 102 is connected by the plug connection (shown as a dotted line) to contacts D4A which are now closed and by plug connections 103 and cam contacts P17 to the gripper magnets GM. When, therefore, P.17 contacts close just before Z (Fig. 12) the gripper magnets are energized to release the levers 95 and 96. At this moment, however, the two levers are being re-set by the pin 97, but the pin releases lever 95 before the gripper magnets are de-energized. Lever 95, therefore, turns into the position shown in dotted lines in Fig. 2, in which its cam surface is clear of the grippers, while lever 96 remains latched in the position shown in full lines. At this moment also, the first gripper (87*a* in Fig. 3) is approaching the cam surface of lever 96 and a little later (after E in Fig. 12) the cam surface is engaged to open the gripper as indicated in Fig. 12. At the beginning of the next cycle, when the front edge of the card has just passed the sensing point, the first gripper moves clear of lever 96 and, since lever 95 is tripped, closes to grip the card. The card and the first gripper 87*a* are then in the positions shown in Fig. 3. The second gripper 87*b* is at this moment opened by lever 96 and in turn closes when reaching the horizontal position. Similarly the other gripper closes in turn, thus holding the card around the periphery of the gripper roll.

As the card advances, its records are sensed in the lower sensing station, and those in the first section of the card have to be printed in this cycle. In Fig. 9A, 14 is the gripper roll, which serves also as contact roll, and this is connected to line 7 through cam contacts T5, the circuit breakers CB and the lower card lever contacts LCL.A, now closed. Numerals on the roll 14 indicate columns on the card, only some being shown. The brushes on columns 9 to 26 are connected by plug connections 15 through contacts R2A, R3A and R4A (as shown), plug connections 17, contacts F.1A (as shown), print magnets PM.9 to 26 to line 6. These print magnets are those operative in known printing mechanisms to control the printing, as the result of the printing magnet receiving one impulse in a cycle for printing a number or two impulses for printing a letter. A printing apparatus of this type is shown and described in U. S. Patent No. 2,076,713, for example, to E. A. Ford issued April 13, 1947, in connection with an interpreter adapted to print on a card the information recorded thereon by punched holes.

A little after 1 in the cycle, cam contacts P16 close to complete a circuit from line 6, through cycle relay C3, contacts C4.A, shifted, and cam contacts P16 to line 7. Contacts C3.B then shift to provide a holding circuit through contacts C2.C, C1.C, CS.A to line 7. At the same time, contacts C3.C open and leave relay C4 holding through contacts P.15. P.15 and P16 both open at X, and then relay C4 is de-energized, while C3 remains energized.

Cycle 3 relay C3 also closes its contacts C3.D which complete a circuit a little before Z from line 7, cam contacts P.7, contacts C3.D and D4.C, cam contacts P.18 and gripper magnets GM to line 6. Cam contacts P.18 give a longer contact than contacts P.17, with the result that the gripper magnets remain energized till after pin 97 has released lever 96. Consequently both levers 95 and 96 are released to take up their dotted line positions as in Fig. 2. As a result, when the front edge of the card reaches the position shown in Fig. 3, the card is held by grippers 87*b* as well as by grippers 87*a* and is securely held on the gripper roll for another turn of the roll.

The closing of contacts C3.D also closes a circuit through contacts D4.E and relay R4 to line 6. Relay R4 then changes over its contacts R.4A which disconnects the print magnets PM.9 to 26 from the brushes on columns 9 to 26 and connects them, respectively, to the brushes on columns 27 to 44, which contain the second line of the address to be printed. Relay R4 also changes over the contacts R.4B to provide a holding circuit via cam contacts T6 which break after Y.

Similarly, in the next cycle, cycle relay C2 is energized and relay C3 de-energized. A circuit is then completed through contacts C2.D and D4.D and through cam contacts P.18 to the gripper magnets, and also through contacts D4.F to relay R.3. This relay changes over its contacts R.3A to connect the print magnets PM.9 to 26 to the brushes on columns 45 to 62, which contain the third line of the address to be printed, and also changes over contacts R3.B to provide the holding circuit via T6.

Similarly again, in the next cycle, cycle relay C1 is energized and relay C2 de-energized and, by similar circuits, contacts R.2A are changed over to connect the print magnets to the brushes on columns 63 to 80, to print the fourth line of the address. There is no circuit through contacts C1.D to the gripper magnets and the grippers therefore open near the end of the cycle and remain open. A little after 1 in the cycle, when contacts P.16 close, a circuit is completed from line 6, through relay CS, contacts C1.A (now closed), C2.A, C3.A and C4.A and cam contacts P.16 to line 7. Relay CS has a holding circuit through its contacts CS.B and cam contacts P.4. Contacts CS.A open, and put relay C1 under control of cam contacts P.15 via contacts C1.B (closed), C2.B, C3.B and C4.B, and the circuit is broken when P.15 opens at X. The circuits through contacts C4.D to C1.D are all broken. Contacts R2.A remain closed until after Y, when the hold circuit to relay R2 is broken by T6 contacts opening.

The opening of contacts P.15 also breaks the circuit of relay S and its contacts SA close to complete the circuit through the auxiliary feed magnet, so that when P3 closes towards the end of the cycle, this feed magnet will be energized. Since the grippers are not closed, the first card will no longer be held to the gripper roll and will be fed to the stack, while the following card will be fed to the lower sensing station.

There will now be explained the Auto control device by which the correct sorting of the cards is checked, namely that the detail card or cards following the address card have the same control number. The control number recorded in columns 2 to 8 of the cards is sensed by brushes in both the upper and lower sensing stations. Only three brushes are shown, connected to plug sockets 12 from which plug connections are made to plug sockets 13. These plug sockets in the upper station are connected to one winding of the differential relays A1, A5, A7, respectively, and the plug sockets 13 in the lower station are connected by lines 18 to the other winding. The two windings oppose each other, so that, if the same digit is sensed simultaneously in the two sensing stations in the same column of two cards, the relay A is not energized. One or more of the relays A is or are energized only if different digits, indicating different control numbers, are sensed at the two stations.

The relays A close contacts A1.B, A5.B, A7.B in the circuits of holding windings AH on the same core as the differential windings, thereby holding the relays through cam contacts P.4.

The relays A also operate contacts A1.A, A5.A, A7.A connected in series and a plug connection 19 is made from contacts A1.A to plug socket 163. So long as no relay A is energized as a result of differing control numbers, a circuit is completed from line 6, plug socket 163, plug connection 19, the series of A.A contacts and relay 16 to line 7.

If relay 16 be de-energized as a result of differing control numbers, its contacts 16A close to complete a circuit from line 7, cam contacts T3, contacts 16A, relay 5 to line 6. Relay 5 then opens its contacts 5A in the start circuit and 5B in the feed magnet circuit to stop operation of the machine.

During the passage of the first card through the upper sensing station, the relays A1, A5, A7 are all energized, because there is no card at the lower station. To maintain relay 16 energized during the period when there is no card in the lower station, the series of contacts A1.A to A7.A is shunted by a circuit through switch 8 and contacts LCL.B, which are closed until the lower card lever is operated by a card in the lower station. The series of contacts is also shunted by contacts SC which are closed during the sensing of the address data.

Referring to Fig. 9A, the print magnets PM.45 to PM.62 are shown connected to the brushes on columns 45 to 62 through contacts 1PC.A. These magnets may be employed to print items from the detail cards following the address card. Relay 1PC is energized during the printing of the address by a circuit from line 6, relay 1PC, contacts SD (closed during the address printing), cam contacts P7 and contacts 2C (closed). Thereby contacts 1PC.A are opened to disconnect print magnets PM.45 to 62 during the address printing. A holding circuit for relay 1PC is provided through contacts 1PCB and cam contacts T6. During the item printing, print magnets PM9 to 26 are disconnected from the plug connections 17 by the change over of contacts F1.A which is effected when relay F1 is energized by the circuit through contacts SE and cam contacts P7. Contacts SE are closed when address cards are not being sensed. A holding circuit for relay F1 is made through contacts F1B and cam contacts T6.

There will now be described the second example of a use to which the invention may be put. Fig. 11 shows a portion of a card of known type in which two independent data are recorded in each column of the section marked C of the card. Sections A and B are purely explanatory, and from these it will be seen that there are two sets of index positions in a column. For the set shown in section A, the values of the index positions are shown at the left edge of the card, while for the other set the values are shown on the right. The number 246 is shown recorded on the set in section A and the number 357 on the set in section B. The two numbers are shown recorded in section C which represents the actual card. The set of index positions shown in section A will be termed the upper set, because the index positions are higher up on the card, and the other set will be termed the lower set. The lower set will be read in the upper brushes, and the machine may be arranged to sense the card twice in the lower brushes. This may be done by recording a 2 in a column, as described for the address cards, or, if every card is to be sensed twice, plug socket 167 may be connected to plug socket 104 instead of connecting plug sockets 12 and 13. A connection is also made between sockets 165.

Between the two sensings in the lower brushes, however, the card must be shifted relatively to the cycle of the machine, so that on the first sensing the brushes sense the lower set of index positions at the correct times in the cycle, while the brush circuit is broken by the circuit breakers CB when the brushes pass over the other set.

On the second sensing, the brushes must sense the upper set at the correct times. The necessary phase shift is effected by the differential gearing shown on the left in Figs. 7 and 8, and the wheel 74 must now be regarded as loose on the shaft 75.

An arm 105 is fixed to shaft 75 and carries a short shaft 106. On the upper end of this is fixed a gear wheel 107 (Fig. 7) engaging a gear wheel 108 fixed to the wheel 74. On the lower end of shaft 106 is fixed a gear wheel 109 engaging a gear wheel 110 loose on the shaft 75. If the wheel 110 be assumed to be held stationary, the rotation of arm 105, causing wheel 109 to roll around wheel 110, will rotate wheels 108 and 74, and turn the gripper roll 80.

The wheel 110 is normally held stationary by an arm 111 fixed to its hub, and the arm is held stationary by the armature 112, pivoted at 114, of a magnet 113. If the magnet 113 be energized, the arm 111 moves into the position shown in dotted lines in Fig. 6, thus turning the wheel 110 counterclockwise, and altering the phase of the drive from wheel 22 to wheel 74, so that the card presents the upper set of index positions to the sensing brushes at the correct times in the cycle.

For re-setting the differential gear, a gear wheel 115 is fixed to the shaft 75 and engages a gear wheel 116 on a shaft 117 turning in a bush 118 fixed to the plate 119 supporting the magnet 113 and armature 112. The shaft 117 carries an arm 120 (Fig. 8) which, as it turns counterclockwise, engages the projection 121 on the arm 111 and restores it to the position in which it is latched by the armature 112.

In describing the operation of sensing an address card four times, it was assumed that the wheel 74 was fixed to the shaft 75. In a machine, however, in which both address cards such as the card of Fig. 10 and cards such as the card of Fig. 11 may be used, the differential gearing just described, with wheel 74 loose on the shaft 75, is fitted, the machine being adapted for the address cards as long as the magnet 113 is not energized.

Assuming that a plug connection has been made from 104 to 167, at 9 in the cycle, circuits will be made from line 7, cam contacts T5 (Fig. 9A), circuit breaker CB, line 100, contacts UCL.A (Fig. 9B), plug connection 104–167, relays SD2 to line 6 and contacts D2B, relay D2 to line 7. Relay SD2 will set up relay S and relay D2 will hold through contacts CS.A in a similar manner to that already described.

The plug connections 103 to the distributor relays R4, R3 and R2 are removed since no distribution between brushes and print magnets is required. Consequently during this cycle no circuit is made through contacts C2D, until cam contacts P7 and P17 close after Y. The gripper magnets GM then receive a short impulse to cause sequential release of the grippers as described.

Towards the end of the next cycle, relay C1 is energized under control of P16 and contacts C1D are closed. When contacts P7 close, a circuit will be made from line 7, contacts 2C, cam contacts P7, contacts C1D, contacts D2D, plug connection between sockets 165, magnet D1F to line 6. The magnet D1F is that designated 113 in Fig. 6. Thus the energization of the magnet causes a change in phase of the feed as already described to allow of sensing the second set of data.

While the invention has been illustrated and described as a device for causing a record to pass a line of sensing brushes repeatedly for repeated sensing of data in the fields thereof, it will be appreciated that instead of a line of brushes, there could be provided a line of printing wheels or other recording elements to effect recording on the record within the spirit of the invention.

What is claimed is:

1. In a cyclically operating machine, apparatus for feeding records in a normal course from a magazine to a stacker, a sensing station located intermediate of the magazine and stacker in the line of travel of said records, and means for diverting a record from said normal course after it has been sensed at the sensing station, comprising means for moving said record one or more times in a circular path tangential to said normal course.

2. In a cyclically operating machine, apparatus for feeding records in a normal course from a magazine to a stacker, a sensing station located intermediate of the magazine and stacker in the line of travel of said records, and means for diverting a record from said normal course after it has been sensed at said sensing station, comprising means for turning said record in a complete circular path including said sensing station one or more times and to position said record at a sensing position at the termination of each turning.

3. In a cyclically operating machine, apparatus for feeding records in a normal course from a magazine to a stacker, a sensing station located intermediate of the magazine and stacker in the line of travel of said records, and means including an element at said sensing station for moving said record in a closed path including said sensing station one or more times after it has been sensed at said sensing station.

4. The mechanism of claim 1, said moving means comprising a rotating contact roll situated at said sensing station and having record grippers at each end, and magnet controlled means for operating said grippers which hold the record on to the periphery of the contact roll when operated.

5. In a cyclically operating machine, apparatus for feeding records carrying control designations in a normal course from a magazine to a stacker, a sensing station located intermediate of the magazine and stacker in the line of travel of said records, means for sensing said control designations, and means for diverting a record from said normal course after it has been sensed at the sensing station, comprising means for moving said record one or more times in a circular path tangential to said normal course.

6. The mechanism of claim 5, said moving means comprising a rotating contact roll situated at said sensing station and having record grippers at each end, and magnet controlled means for operating said grippers which hold the record on to the periphery of the contact roll when operated.

7. In a cyclically operating machine, including a plurality of sensing stations positioned intermediate of a magazine and stacker, means for feeding a record in a normal course past the first of two sensing stations, means for feeding the record past the second sensing station, a pair of clutch devices, one for each record feeding means for controlling its operation, and means controlled by a record at the first sensing station to activate the clutch device controlling the feeding means for the second sensing station independently of the clutch device for the first sensing station, whereby the record is fed in a diverted course while the first feeding means is inoperative.

8. In a cyclically operating machine, apparatus for feeding records carrying control designations in a normal course from a magazine to a stacker, a plurality of sensing stations located intermediate of the magazine and stacker in the line of travel of said records, a rotating contact roll situated at the second of two sensing stations, a record gripper at each end of said roll, means responsive to a sensing of a control designation at the first sensing station for operating said grippers thereby diverting the record from its normal course and holding it to the periphery of said contact roll which moves said record one or more times in a circular path tangential to said normal course at the second sensing station, the value of the control designation determining the number of rotations of the contact roll during which the grippers are operated to cause the record to be diverted for repeated sensing.

9. In a cyclically operating machine, apparatus for feeding records having a plurality of fields and carrying control designations thereon in a normal course from a magazine to a stacker, a sensing station located intermediate of the magazine and stacker in the line of travel of said records, means for diverting a record from said normal course after it has been sensed at the sensing station, comprising means for turning said record one or more times in a circular path, including said sensing station to position said record at a sensing position at the termination of each turning, means responsive to a sensing of a control designation at the sensing station for determining the number of times a record is moved past the sensing station, and means for sensing the plurality of fields successively upon successive movements of the record past the sensing station, whereby the printing of data derived from each field is effected on a different line of said record.

10. In a cyclically operating machine, apparatus for feeding records carrying control designations in a normal course from a magazine to a stacker, a plurality of sensing stations located intermediate of the magazine and stacker in the line of travel of said records, means positioned at the second of two sensing stations for diverting a record from said normal course after it has been sensed at the second station, comprising means for turning said record one or more times in a circular path including the second sensing station to position said record at a sensing position at the termination of each turning, means responsive to a sensing of a control designation at the first sensing station for determining the number of times a record is moved past the second sensing station and means for sensing the plurality of fields successively upon successive movements of the record past the second sensing station, whereby the printing of data derived from each field is effected on a different line of said record.

11. In a cyclically operating machine, apparatus for feeding records having a plurality of sets of index positions and carrying control designations thereon in a normal course from a magazine to a stacker, a sensing station located intermediate of the magazine and stacker in the line of travel of said records, means for diverting a record from said normal course after it has been sensed at the sensing station, comprising means for turning said record one or more times in a circular path including said sensing station to position said record at a sensing position at the termination of each turning, means responsive to a sensing of a control designation at the sensing station for effecting a phase shift of said turning means between two sensings, whereby different sets of index positions are presented at the sensing position in the two sensings.

12. In a cyclically operating machine, apparatus for feeding records having a plurality of sets of index positions in a normal course from a magazine to a stacker, a sensing station located intermediate of the magazine and stacker in the line of travel of said records, means for diverting a record from said normal course after it has been sensed at the sensing station, comprising means for turning said record one or more times in a circular path including said sensing station to position said record at a sensing position at the termination of each turning, means for effecting a phase shift of said turning means between two sensings, whereby different sets of index positions are presented at the sensing position in the two sensings.

13. In a cyclically operating machine, apparatus for feeding records having a plurality of sets of index positions and carrying control designations thereon in a normal course from a magazine to a stacker, a sensing station located intermediate of the magazine and stacker in the line of travel of said records, means for diverting a record from said normal course after it has been sensed at the sensing station, comprising a rotating contact roll for holding the record on its periphery and turning said record one or more times in a circular path including said sensing station to position said record at a sensing position at the termination of each turning, a differential gear connected through gearing to said contact roll and means responsive to a sensing of a control designation at the sensing station for turning one element of the differential gear thereby effecting a phase shift of said contact roll between two sensings, whereby different sets of index positions are presented at the sensing position in two sensings.

14. In a machine of the class described, a supply magazine, a stacker, means for advancing a succession of records from said magazine to said stacker along a predetermined path, a record sensing element located in said path, means for diverting the records from said path at a point between the element and stacker, feeding the same in a second predetermined path to a point on the first predetermined path between the magazine and element, and returning them to the advancing means whereby the record will be fed by said advancing means past the sensing element a second time.

15. The invention set forth in claim 14 in which control means is provided to render said diverting means selectively effective to divert any of the records.

16. The invention set forth in claim 15 and further control means to render said diverting means repeatedly effective to cause a record to pass the sensing element a predetermined number of times prior to its return to the advancing means.

17. In a machine of the class described, a supply magazine, a stacker, means for advancing a succession of records from said magazine to said stacker along a predetermined path, an element located in said path, means for diverting the records from said path at a point between the element and stacker, feeding the same in a second predetermined path to a point on the first predetermined path between the magazine and element, and returning them to the advancing means whereby the record will be fed by said advancing means past the element a second time.

18. In a cyclically operating machine, apparatus for feeding records having a plurality of sets of index positions in a normal course from a magazine to a stacker, a sensing station located intermediate of the magazine and stacker in the line of travel of said records, means for diverting a record from said normal course after it has been sensed at the sensing station, comprising means for turning said record one or more times in a closed path including said sensing station to position said record at a sensing position at the termination of each turning, means for effecting a relative adjustment between said turning means and said sensing station between two sensings, whereby different sets of index positions are presented at the sensing position in the two sensings.

HAROLD H. KEEN.

REFERENCES CITED

The following references are of record in the file of this patent:

UNITED STATES PATENTS

| Number | Name | Date |
|---|---|---|
| 2,434,512 | Page et al. | Jan. 13, 1948 |
| 2,493,858 | Carroll et al. | Jan. 10, 1950 |
| 2,501,271 | Ghertman | Mar. 21, 1950 |